Feb. 6, 1940.    O. HACKER    2,189,109
MOTOR VEHICLE TRANSMISSION
Filed Jan. 14, 1938
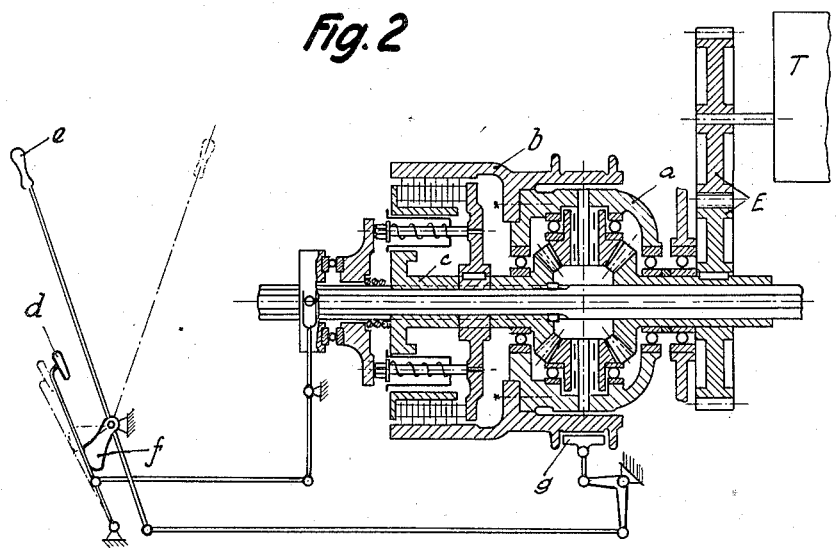
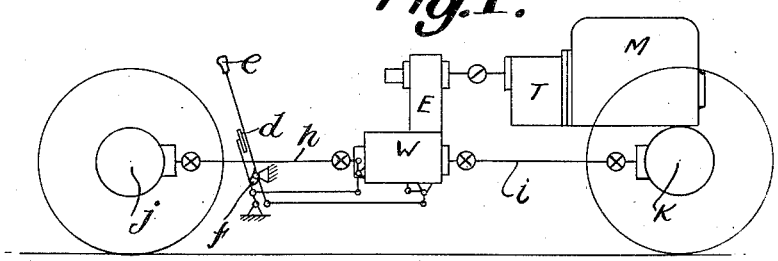
O. Hacker
inventor
By: Glascock Downing & Seebold
Attys Patented Feb. 6, 1940

2,189,109

UNITED STATES PATENT OFFICE 2,189,109

MOTOR VEHICLE TRANSMISSION

Oskar Hacker, Steyr, Austria, assignor to Steyr-Daimler-Puch A. G., Steyr, Austria Application January 14, 1938, Serial No. 185,046
In Austria May 15, 1937

3 Claims. (Cl. 74—297)

This invention relates to an arrangement for driving motor vehicles, having an hydraulic gear and an additional gear in the drive, more particularly a change gear as the additional gear in the drive. An object of the invention is to provide a suitable control member for the additional gear. The control member has the advantage over the known control devices in that when driving forward only one pedal must be operated for uncoupling the drive and when changing over for the reverse drive of the vehicle only one hand lever need be operated. Thus only one control member need be operated when changing over for reversing the vehicle.

According to the invention the arrangement is such that the clutch pedal or the like which may be actuated by the member controlling the additional gear or actuated independently of the latter operates a clutch which connects the carrier for the planet wheels of the additional gear with the drive input or the drive output shaft and thus establishes a direct driving connection which is disconnected, when the control member associated with the additional gear is operated.

The preferred constructional form of the drive arrangement is one in which the additional gear is formed by a planet wheel reversing gear. In this case the arrangement according to the invention is such that the hand lever or the like puts into operation a brake for the carrier of the planet wheels of the additional gear and at the same time actuates the clutch pedal by means of a cam or the like. When actuating the hand lever, the direction of rotation is reversed by blocking the carrier, and at the same time the clutch is released which establishes the propelling the vehicle connection for driving forwards.

Thus, according to the invention the disconnection (uncoupling) of the drive, is effected when travelling forward, only by means of a pedal and the change over to the reverse only by means of a hand lever which actuates the brake for the casing of the change gear and by blocking the latter reverses the direction of rotation and at the same time actuates by way of a cam or the like the pedal for disconnecting the drive.

When mechanical gear stages are provided behind the turbo and additional or reversing gear, the drive may be uncoupled for shifting gear in a manner with which every motorist is familiar, namely by simply depressing the pedal which corresponds to the clutch pedal of motor cars with mechanical gears. The arrangement may be such that it does not necessarily require a clutch in the reversing gear, as sun and planet reversing gears can be operated simply by actuating brakes for arresting their planet parts.

The accompanying drawing shows in Figure 1 a diagrammatic representation of the drive with the actuating members and in Figure 2 a change gear with clutch in section.

According to Figure 1 the driving unit consists of the engine M, the turbo drive T disposed behind the engine, an optional transmission gear E and the change gear W, behind which mechanical gearing down stages may be provided; the drive is transmitted finally by means of the shafts $h$, $i$ to the axles $j$, $k$.

When travelling forwards, the drive is transmitted from the engine by way of the turbo drive T and the optional transmission gear E to the change gear casing $a$ and the outer parts $b$ of the clutch and thence through the laminations of the clutch to the inner part $c$ of the clutch, from where the drive is transmitted to any gearing down stages which may be provided or to the axle drives.

When driving forwards no lever is actuated except the accelerator pedal. When mechanical gearing down stages are provided and these are to be operated during forward driving, the clutch pedal $d$ is completely depressed, in order to bring about the interruption of the drive which is required for changing the gearing down stages by hand.

For driving in reverse the hand lever $e$ is moved to the dotted line position shown in Fig. 2 and the clutch pedal $d$ is actuated by the cam $f$ provided on the hand lever. The clutch is thus released and the drive interrupted.

Such movement of the hand lever $e$ moves the brake band $g$ into engagement with the brake drum carried by the outer part $b$ of the clutch. The gear casing $a$ is thus locked and the direction of rotation of the change gear is reversed. Power will thus be transmitted to axles in a reversed direction of rotation.

What I claim is:

1. Apparatus for controlling motor driven vehicles having a hydraulic gear and an additional gear in the drive comprising, a control member for controlling the additional gear, a clutch, a control member for the clutch, said first control member upon operation being adapted to actuate at the same time the clutch control member for uncoupling the drive, and said control member for the clutch being adjustable independently of the first control member.

2. A controlling arrangement according to claim 1, characterized by the feature that the control member for the additional gear is designed as a hand lever and the control member for uncoupling the drive is designed as a pedal.

3. A controlling arrangement according to claim 1 in which the additional gear is formed by a planet wheel reversing gear and the control member thereof operates a brake for locking a casing of the planet wheels of the additional gear and simultaneously operates the control member of the clutch through an intermediate member for reversing the drive.

OSKAR HACKER.